ated Sept. 14, 1909.

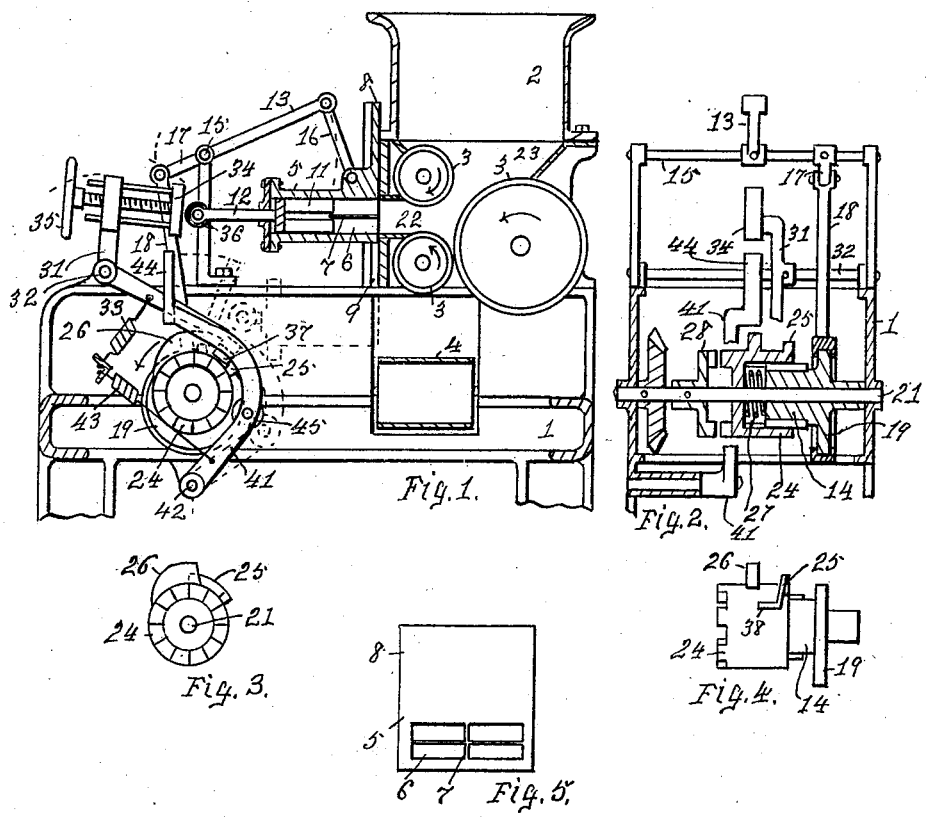

UNITED STATES PATENT OFFICE.

CHARLES H. OVERKAMP, OF CINCINNATI, OHIO.

SCALING-MACHINE.

934,417.

Specification of Letters Patent. Patented Sept. 14, 1909.

Application filed September 16, 1908. Serial No. 453,243.

*To all whom it may concern:*

Be it known that I, CHARLES H. OVERKAMP, a citizen of the United States, residing at Cincinnati, Ohio, have invented a new and useful Improvement in Scaling-Machines, of which the following is a specification.

My invention relates to scaling machines for dough or other plastic material and the objects of my improvements are to provide cam and lever mechanism for moving the dough box and plunger intermittently and in predetermined time relation to each other; to provide a positive clutch and lever mechanism for automatically starting and stopping said mechanism in a predetermined position; to provide means for initiating the movement of the intermittently movable members by the action of the dough under a predetermined pressure; to partition the dough box into separate chambers for simultaneously scaling a plural number of loaves or buns; to provide interchangeable dough boxes and plungers to adapt the machine to a wider range of uses; and to provide simple and durable construction and assemblage of parts for securing facility of operation and efficiency of action. These objects are attained in the following described manner, as illustrated in the accompanying drawings, in which:—

Figure 1 is a longitudinal section of a scaling machine embodying my improvements; Fig. 2, a transverse section in the line of the clutch shaft; Figs. 3 and 4 respective end and front elevations of the movable clutch member showing the position of the cams thereon, and Fig. 5, a front elevation of the dough box with partitions and cut off plate.

In the drawings, 1 represents the frame, 2 the hopper thereon, 3 the feed rolls and 4 the delivering apron, all constructed and arranged in the ordinary manner. The dough box 5 is divided into a plural number of chambers 6 by means of the partitions 7 and formed with a cut off plate 8 whereby it is slidably mounted in guide grooves 9. A series of plungers 11 formed on the same head and provided with a single stem 12 are thereby movable within the corresponding chambers 6. An arm 13 secured on the rock shaft 15 is connected with the dough box by means of a link 16 and an oppositely extended arm 17 secured on said shaft is connected by means of a pitman 18 with an eccentric 19 which is idly mounted on the driven shaft 21 for intermittently moving the dough box into and out of registration with the discharge opening 22 in roll chamber 23. A positive clutch member 24 formed with an inclined stop 25 and with a short cam 26 is splined on the hub 14 of the eccentric 19 and is automatically movable by means of the compression spring 27 into engagement with the corresponding clutch member 28 which is secured on shaft 21. A bell crank lever 31 pivotally mounted on the frame by means of a shaft 32 and movable in one direction by means of a spring 33 is provided on one end with a stop 34 which is adjustable thereon by means of a hand screw 35 for contacting with the anti-friction wheel 36 on the end of the plunger stem 12. An anti-friction roller 37 mounted on the opposite end of said lever is adapted to engage with the inclined stop 25 for shifting the clutch member 24 on the hub 14 against the yielding exertion of the spring 27 and out of engagement with the corresponding clutch member 28. When clutch member 24 is thus disengaged from the member 28, the lip 38 thereon contacts with the anti-friction roller 37 for maintaining the intermittently movable parts out of action and in predetermined positions.

A curved arm 41 pivotally secured at one end to the frame at 42 and movable in one direction by means of a spring 43 terminates at its other end in a knocker 44 and is provided with an anti-friction roller 45 arranged to ride on cam 26 for moving said arm in the opposite direction.

In operation, the feed rolls, the shaft 21 and the apron are driven at respective constant speeds in the usual manner by driving connections (not shown). The dough is forced by the feed rolls within the chambers of the dough box under sufficient pressure to drive the plungers in a rearward direction with the roller on the plunger stem into contact with the adjustable stop 34 whereby the bell crank lever is rocked with the anti-friction roller on its opposite end out of engagement with the inclined stop on the movable clutch member. The exertion of spring 27 then moves said clutch member into engagement with the corresponding rotating member 28 whereby the eccentric 19 actuates the connections therewith to move the dough box downward into the position shown by dotted lines in Fig. 1. In the meantime bell crank lever 31 has returned to its normal position. When the dough box is slowly moving through its lowermost position the contact of cam 26 with the roller 45 actuates the curved lever with the knocker thereon into contact with the roller on the plunger stem for moving the plunger in a forward direction and thereby discharging the scaled dough from the dough box and upon the delivery apron. The continued movement of the eccentric 19 returns the dough box to its former position of registration with the discharge opening 22, then the action of the inclined stop 25 upon the roller 37 disengages the clutch members and locks the intermittently movable parts out of action.

A dough box provided with a single chamber and appropriate plunger or other forms and construction of dough boxes may be substituted if desired for the chambered bun box shown in the drawings.

Having fully described my improvements, what I claim as my invention and desire to secure by Letters Patent of the United States is:—

1. In a scaling machine, the combination with the hopper, of a dough box adapted to intermittently register with the outlet from the hopper, a plunger in said box adapted to be moved by the dough fed into said box, a clutch member fixed to the driving shaft of the machine, a co-acting sliding clutch member on said shaft bearing on its periphery an inclined stop and a cam, an eccentric idle on said shaft but splined to the movable member of said clutch, and means coöperating respectively with said inclined stop, eccentric and cam for successively throwing the clutch, reciprocating the dough box and actuating the plunger to discharge the dough.

2. In a scaling machine, the combination with the hopper, of a dough-box adapted to intermittently register with the outlet from the hopper, a plunger in said box adapted to be moved by the dough fed into said box, a clutch member fixed to the driving shaft of the machine, a co-acting sliding clutch member on said shaft bearing on its periphery an inclined stop and a cam, an eccentric idle on said shaft but splined to the movable member of said clutch, a spring between the members of the clutch for separating them, a lever for engaging the inclined stop and adapted to be moved by said plunger to release said movable member of the clutch, a pitman connecting the eccentric with the dough-box, and a lever for engagement by the cam and adapted to move the plunger to discharge the dough.

3. In a scaling machine, the combination with the hopper having a lateral discharge opening, of a slide mounted to reciprocate past said opening and to cut off the dough passed therefrom, a dough-box divided into a plurality of chambers and formed upon and movable with said slide and adapted to receive dough into said chambers when opposite said opening, a series of plungers adapted to reciprocate respectively in said chambers, a compound clutch, eccentric, inclined stop and cam mounted on the driving shaft of the machine, a pitman and lever coöperating with the eccentric for reciprocating said slide and dough-box, a lever adapted to be actuated by said plungers and to engage said inclined stop to throw said clutch into action, and a lever for engagement by said cam and adapted to force said plungers through the dough chambers to discharge the molded dough.

CHAS. H. OVERKAMP.

Witnesses:
W<small>M</small>. P. T<small>UECHTER</small>,
R. S. C<small>ARR</small>.